July 20, 1965 H. H. FRANK 3,195,377
PIPE REAMER
Filed Oct. 26, 1962 2 Sheets-Sheet 1

INVENTOR.
HEINRICH H. FRANK
BY
ATTORNEY

July 20, 1965   H. H. FRANK   3,195,377
PIPE REAMER

Filed Oct. 26, 1962   2 Sheets-Sheet 2

INVENTOR.
HEINRICH H. FRANK
BY
*J. D. Douglass*
His ATTORNEY

United States Patent Office 3,195,377
Patented July 20, 1965

3,195,377
PIPE REAMER
Heinrich H. Frank, Elyria, Ohio, assignor to The Ridge Tool Company, Elyria, Ohio, a corporation of Ohio
Filed Oct. 26, 1962, Ser. No. 233,230
8 Claims. (Cl. 77—73)

This invention relates to reamers and more particularly to an anti-friction tapered reamer particularly useful in the reaming of burrs from pipe or tubing.

As is well known to those versed in the art, after a pipe or tube is cut by the use of a pipe or tubing cutter a burr or flange is usually formed on the inner edge of the end of the pipe due to the displacement of the material by the cutter. It is common practice to remove such burrs by the use of a reamer which is usually tapered. Heretofore these reamers have usually comprised a body of tapered formation which is provided with a plurality of blades set at an angle to the axis of the body and which may be either straight or spiral. Sometimes the body is made in the form of a cone with one or more blades set into the cone.

It has become common practice to use large diameter tubing made of copper, brass, aluminum and stainless steel. In the field, the pipe is usually cut with a pipe or tubing cutter and then, particularly with the softer metals, the burr is reamed out by hand. Recently there have come upon the market motor driven machines having a plurality of spindles some of which carry brushes for brushing the tubing prior to rolling, brazing or welding and some of which bear reamers of various sizes for reaming out the burrs. The machine usually sets upon a stand or legs and the pipe or tube is brought into juxtaposition with the brush or reamer to perform the brushing or reaming operation.

Since the pipe is held by hand, there is a tendency for the reamer blades to "hog" into the work, particularly in the softer metals, and to cause the pipe to "hang up" on the reamer to such an extent that the workman cannot hold the pipe against turning. The pipe also vibrates or "chatters" when high surface cutting speeds are used. These conditions are particularly prevalent in the multi-bladed reamers where all three or more blades bite into the material at the same time. In the single bladed reamers the same thing is liable to occur because, although the body may be a cone, the pipe is only engaged in two places, one tangent to the inside of the pipe opposite the blade and the other at the blade. The result is that the blade digs in and jerks the pipe out of the hands of the worker and frequently provides a reamed surface that is not concentric with the inner wall of the pipe and which may also be uneven.

The reamer of my present invention enables the reaming to proceed with a smooth operation and at higher speeds and the pipe will not be rotated or jerked in the hands of the workman, because it does not dig into the metal. Furthermore due to its anti-friction and smooth guiding properties less power is required.

With this improved reamer a small cut can be taken from the end of the pipe which removes the burr in an even manner without an excess amount of bevel in the interior periphery of the pipe.

As stated, since the reamer requires less power in its operation, a lighter motor drive may be used which increases the portability of the machine and eliminates the need of special tools to hold the pipe, which tools are apt to mar the pipe surface and take time to attach and detach.

Still another advantage resides in the fact that the reaming blade can quickly and easily be replaced and/or removed for resharpening and a greater economy of manufacture is realized since the main body of the device may be made as a die casting or cast iron.

Still other advantages of the invention and the invention itself, will become more apparent from the following description of an embodiment thereof, which description is illustrated by the accompanying drawings and forms a part of the specification.

Figure 1:
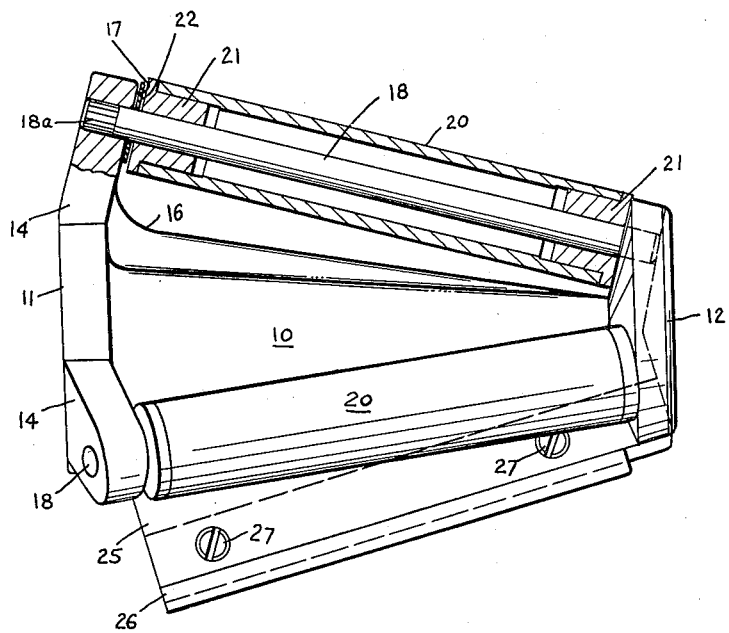
FIG. 1 is a view in side elevation with a portion thereof broken away and shown in section.
Figure 2:
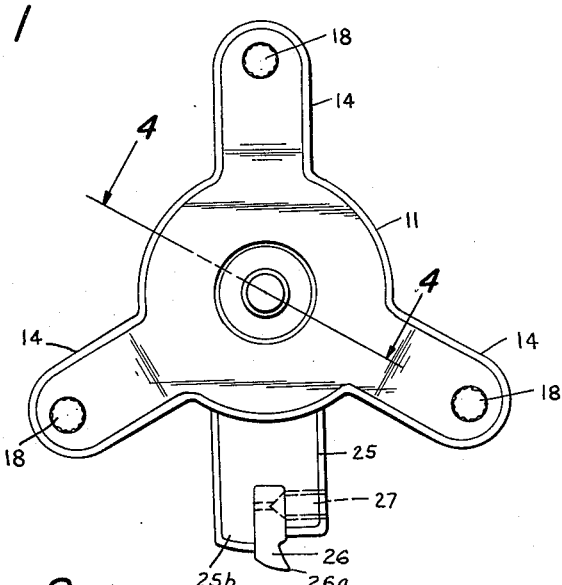
FIG. 2 is an elevational view from the left end of FIG. 1.
Figure 3:
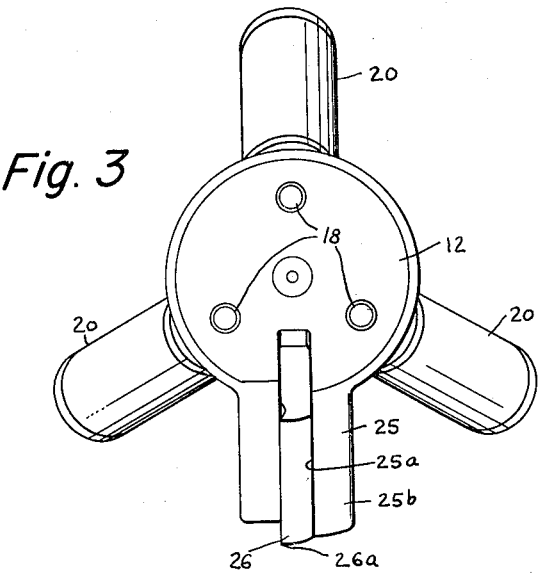
FIG. 3 is an elevational view from the right end of FIG. 1.

Referring now to the drawings, throughout which like parts are designated by like reference characters, the device includes a main body 10 of generally tapered configuration having generally circular bosses 11 and 12 at opposite ends.

The boss 11 is provided with arms 14 which extend outward radially spaced around the body 120° apart, and slant toward the end 12 slightly to provide seats, which, as will later appear, provides bearing surfaces that cooperate with bearing surfaces on the boss 12 for the reception of the rollers. The arms are reinforced by ribs 16 which extend longitudinally of the body. The inner faces of the arms are formed with flat bearing surfaces 17 facing toward the boss 12. Likewise the boss 12 is formed with flat bearing faces 18 which face toward the faces 17. It will be appreciated that the boss 11 and its arms could comprise one circular disc of larger diameter similar to the boss 12.

The arms 14 and boss 12 are bored for the reception of guide roll pins 18. At least one end of each pin is provided with a straight knurl 18a whereby the pin 18, which has a drive fit in the bore, holds the same in place and against turning.

Journalled on the pins 18 are hollow rollers 20 the rollers having self-lubricating bearings 21 which may be of the "oilite" type. Between the ends of the bearings 21 and the arms 14 there are provided antifriction and thrust washers 22.

Midway between two of the rollers 20, the main body is provided with a longitudinally extending reamer blade holding socket 25 which is formed with a longitudinally extending reamer blade seat 25a in the form of a groove of rectangular cross-section. A reamer blade 26 is disposed in the seat and held in place by slotted set screws 27 which preferably engage in recesses or detents in the wall of the blade. The blade is formed with a cutting edge 26a. The socket wall 25 is extended at 25b on the back side of the reamer blade to provide additional support therefor.

It will be appreciated that the cutting edge 26a of the blade extends radially slightly beyond the conical surface defined by circles tangent to the periphery of the rollers and having the same axis as the body 10.

Figure 4:
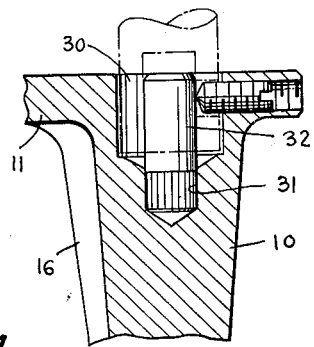
FIG. 4 is a fragmentary section taken on the line 4—4 of FIG. 2.

As previously stated, the reamer is particularly adapted for use on a motor driven machine although the use is not limited thereto. To this end the boss 11 is provided with an axial bore 30, FIG. 4, which has a central counter bore 31 for receiving a centering pin 32, which is pressed into the bore 31. The spindle to which it is to be attached has a center hole for telescoping engagement with the pin 32 and a close fit with the wall of the bore 30 and is held in place by a set screw 33, which extends through a hole in the spindle and engages with the centering pin 32.

In operation the device is rotated by the spindle on the machine and the tube to be reamed is placed with the end over the outside of the rollers and pushed toward the base boss 11. The end edge of the tube is then in tangential engagement with the rollers and the blade in cutting position with the edge of the tube. Even though the blade projects outward from the plane of the rollers slightly if the tube is thin wall tubing, it can flex sufficiently to allow such engagement. Since there is only one reamer blade the power required is greatly reduced. Still further reduction in power is realized because the rollers roll along the edge of the tube. The result is that a clean, smooth cut can quickly be made without placing undue strain on the workman or the motor. In case heavy wall tubing is being used there will be at least two of the rollers and the blade in contact with the tube at all times. This provides at least a three point contact with the end of the tube which has a steadying effect on the tube and prevents chattering.

Have thus described the invention in an embodiment thereof, it is appreciated that numerous and extensive departures may be made therefrom without departing from the spirit or scope of the invention as defined in the appended claims.

I claim:

1. A pipe reamer comprising a body, at least three equally spaced rollers carried by said body and inclined relative to the axis thereof, a cutter blade supported by said body intermediate a pair of said rollers and inclined the same as the rollers said rollers being equally spaced about said body and said cutter blade being disposed between a pair of said rollers.

2. A pipe reamer comprising a body having a plurality of radially extending arms at one end and an outwardly extending portion at the other end, a roller supported by each of the arms and the outwardly extending portion at an angle inclined to the axis of said body to provide at least three equally spaced rollers, a boss formed on said body and extending outwardly between a pair of said rollers and being formed with a longitudinally extending seat inclined at an angle to the axis of said body, and a reamer blade releasably disposed in said seat.

3. A device as described in claim 2, wherein said boss is extended on one side of said seat to provide a reinforcement for said blade.

4. A pipe reamer comprising an elongated tapered body portion, a plurality of arms extending radially from said body portion with their ends inclined at an acute angle relative to the axis of said body, a boss on the other end of said body and being formed with faces facing toward said arms and inclined relative to the axis and parallel to the surface of the facing arms, each of said arms and said boss having a roller supporting pin secured therein and a roller comprised of a pair of end bearings and a sleeve mounted on the end bearings rotatably journalled on said pin between the arms and boss to provide at least three equally spaced rollers, the length of the arms being such that the rollers extend at an angle relative to the axis, blade support means carried by the body and a reamer blade removably disposed in the blade support means and having a cutting edge inclined relative to the axis of said body.

5. A device as described in claim 4, wherein said blade projects beyond the surface defined by a conical surface tangent to the outermost periphery of the rollers.

6. A device as described in claim 4, wherein said body is formed with longitudinally extending ribs which extend outward at the arm supporting end of the body and reinforce said arms.

7. A device as described in claim 4, wherein anti-friction washer means is disposed between the end of the roller and its support.

8. A device as described in claim 7, wherein said body is provided with an axial bore extending into said body and a centering pin is disposed in said bore, and lock means provided for locking a spindle in said bore.

References Cited by the Examiner
UNITED STATES PATENTS
1,793,308  2/31  Eckels _____ 90—12.5 X
FOREIGN PATENTS
9,322  11/28  Australia.

WILLIAM W. DYER, JR., *Primary Examiner*.